May 27, 1952     B. E. HOUSE     2,598,545
BRAKE SHOE
Filed April 26, 1947     2 SHEETS—SHEET 1
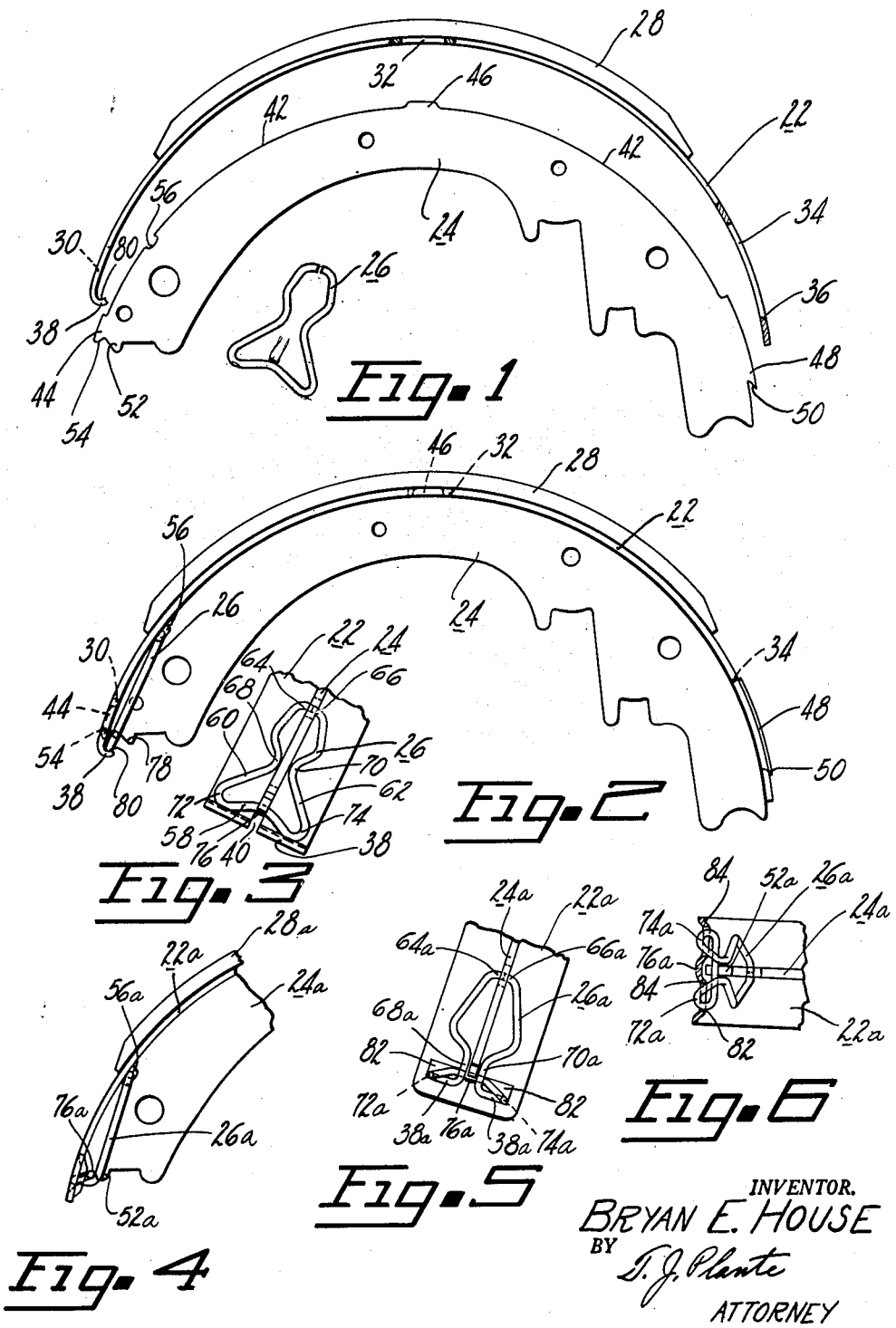
INVENTOR.
BRYAN E. HOUSE
BY T. J. Plante
ATTORNEY

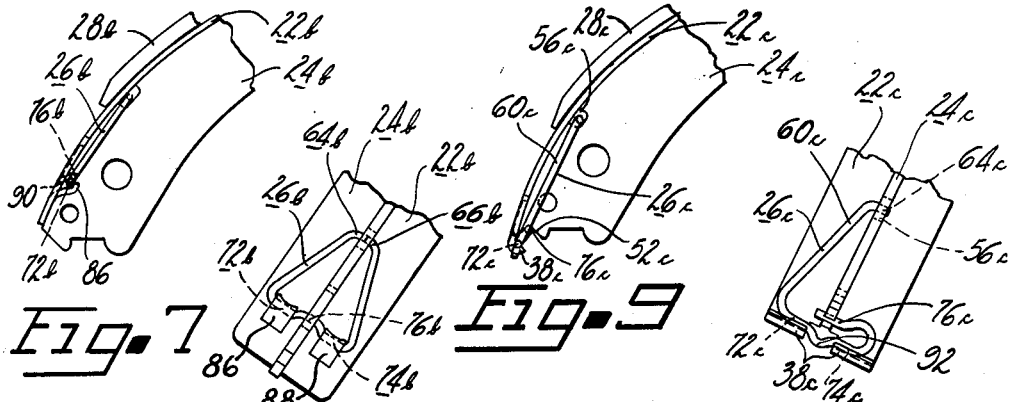
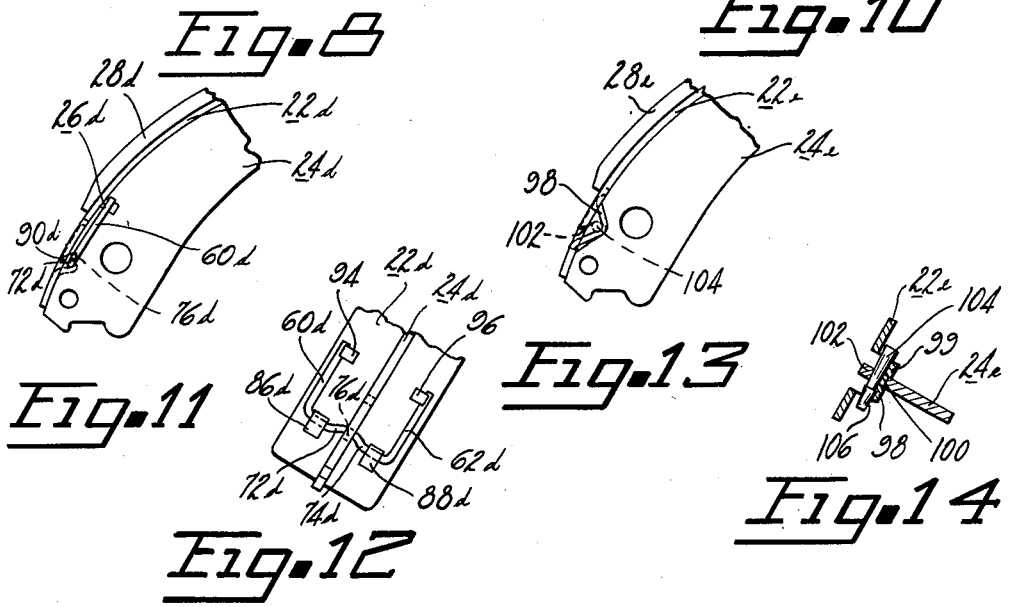
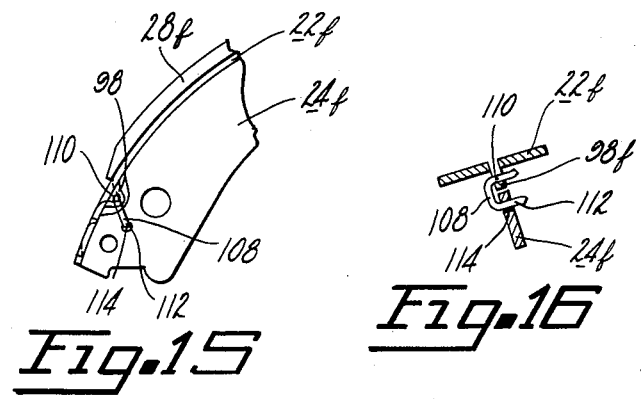

Patented May 27, 1952

2,598,545

UNITED STATES PATENT OFFICE 2,598,545

BRAKE SHOE

Bryan E. House, South Bend, Ind., assignor to Bendix Aviation Corporation, South Bend, Ind., a corporation of Delaware Application April 26, 1947, Serial No. 744,184

18 Claims. (Cl. 188—234)

This invention relates to brake shoe construction, and its primary purpose is to provide a brake shoe having a detachable, or demountable, rim. In other words the rim and web are so constructed and arranged as to be readily detachable from one another when servicing is required, although they are normally firmly held together, or retained in assembly, by reliable holding, or locking, means.

There are several advantages derived from the development of a readily detachable brake shoe rim, among which advantages are the following:

(1) It permits a brake shoe having worn out lining to be serviced simply by removing the old rim and replacing it with a factory-lined new rim. This is particularly important when the lining is bonded to the rim by a thermosetting adhesive, a procedure which may replace the use of rivets and which requires carefully controlled conditions of manufacture.

(2) Because the lining can be bonded to the rim before the rim and web are assembled, the bonding operation can be accomplished much more easily and efficiently than has heretofore been possible.

(3) The shoe rims and shoe webs can be separately stored prior to assembling, thereby saving considerable factory storage space.

(4) The shoe rims and webs do not have to be welded together, and the operating and maintenance costs of welding machines are thus eliminated.

(5) Because the customary restriking operation can be performed on the rim before it is attached to the web, a flatter rim surface can be obtained, nad therefore a better bond between rim and lining is possible. When the restriking is done after the web has been attached to the rim, the presence of the web interferes to some extent with the uniform flattening of the rim surface.

In the preferred embodiment of the present invention, and, as a matter of fact, in nearly all of the embodiments, the web and rim are held in engagement by a resilient, or spring, member. Among the advantages of such an arrangement are the following:

(1) The rim and web can be readily assembled and disassembled because of the "give" in the attaching member.

(2) The shoe is permitted to "breathe," or flex, during operation of the brake, thereby avoiding the noise often associated with brake shoes to which the linings are bonded.

In order to provide a safe and fully reliable shoe assembly, the resilient attaching member is so arranged as to be positively held, or locked, in assembled position.

Other objects and advantages of the present invention will become apparent during the following discussion, reference being had therein to the accompanying drawings, in which:

Figure 1 is an exploded view of the components of my novel brake shoe, shown prior to assembling;

Figures 2 and 3 show the assembled brake shoe, the former figure showing a side view of the shoe, and the latter figure showing a bottom view of a portion of the shoe;

Figures 4, 5 and 6 show side, bottom and end views, respectively, of a modified version of the invention;

Figures 7 and 8 are side and bottom views, respectively, of another modification of the invention;

Figures 9 and 10 are side and bottom views, respectively, of yet another embodiment of the invention;

Figures 11 and 12 are side and bottom views, respectively, of a brake shoe illustrating a further form of the invention;

Figures 13 and 14 are side and cross-sectional views, respectively, of another version of the invention; and Figures 15 and 16 are side and cross-sectional views, respectively, of a brake shoe showing a still further version of the invention.

The arrangement shown in Figures 1 to 3, inclusive, is the preferred embodiment of the invention. The three parts shown in exploded position in Figure 1 are the detachable rim 22, the separately formed strengthening web 24, and the resilient member 26 which is used to retain the rim and web in assembled relationship. The rim 22, which is an arcuate sheet-metal member, carries the lining strip 28, which may be secured to the rim by any suitable means.

For example, the lining may be bonded to the rim by a thermosetting adhesive, which holds the rim and lining together at least as firmly as the customary rivets and which reduces waste of the lining material because there are no rivets heads to limit the extent of permissible wear of the lining.

The rim 22 has three spaced slots 30, 32 and 34 formed therein along the center line, the slots being provided for the purpose of receiving complementary projections formed on the web 24. Referring to the right end of the rim as the "forward" end of the rim, it will be observed that the forward edge of slot 34 has a surface of engagement 36 which makes an acute angle with the outer surface of the rim, thereby providing a space which is adapted to receive a hook-shaped projection 50 on the web.

The rear, or left, end of the rim, which is remote from the surface 36, is turned inwardly to provide a hook-shaped laterally-extending ledge 38, which serves as a support, or seat, for the resilient retaining member 26. The hook-shaped ledge 38 is divided into two sections by the slot 40 (see Figure 3), which is provided in order to permit the web to clear the ledge when it is being assembled with the rim.

The web 24 is a separately formed stamping which has an arcuate surface 42 adapted to engage the inner side of the rim and three outwardly extending projections 44, 46 and 48 arranged to register with the slots 30, 32 and 34, respectively, of the rim, thereby determining the lateral position of the web with respect to the rim. The forward edge of projection 48 has a surface 50 which makes an acute angle with the outer edge of the projection and which is intended to engage the surface 36 on the rim when the web and rim are secured together. The forward end of projection 48 thus acts as a hook which prevents radial displacement of the web with respect to the rim so long as the assembled web and rim are prevented from having relative endwise, or circumferential, movement. In assembling the rim and web, the inclined surface 36 and the hooked end of projection 48 also act as a cam and cam follower, gradually bringing the rim and web into tighter engagement radially, as the web is urged toward the right, or forward, end of the rim.

The left end of the web, which is adjacent the hook-shaped ledge 38 in assembled position, has a ramp surface 52 which is so inclined, as to facilitate moving, or rotating, the resilient retaining member 26 into holding, or locked, position. The ramp 52 terminates in an abutment 54 near the underside of the rim, the abutment being engaged by one side of the resilient member 26 in assembled position.

In order to retain the ends of resilient member 26 in holding, or locked, position after assembly, a slot 56 is provided in the web at a point near the underside of the rim and spaced somewhat from the ramp surface of the web.

The other details in the shape of the web are conventional features of brake shoes which are in widespread use. The invention, is, of course, applicable to brake shoes for various types of brake, without limitation to any particular brake arrangement. The several holes in the illustrated brake web are provided for such purposes as retaining the ends of shoe return springs, locating shoe hold-down devices, and providing a bearing for a lever pivot pin. The contour details of the web except as to the particular features previously noted, are dictated by the requirements of the brake assembly in which the shoe is to be mounted.

The resilient retaining member 26, which is used for locking the web and rim in assembled position, consists of a spring steel element having a curved base portion 58 which is adapted to engage the hook-shaped ledge 38 of the rim at two spaced points, while engaging the ramp 52 of the web centrally, i. e. between the points of engagement with the ledge (as shown in Figure 3). The base portion of the spring element 26 may therefore be said to provide a half-elliptic spring which exerts a tangential force holding the rim and web in engagement.

The center portion of the base of the spring element 26 also engages the abutment 54 to exert a direct radial force holding the web and rim in engagement.

The spring element 26 has integral arms 60 and 62 which extend along opposite sides of the web and which have inwardly turned ends 64 and 66, respectively, extending into the slot 56 in the web to lock the spring element in place. The arms 60 and 62 have inwardly curved guide portions 68 and 70, respectively, intermediate their length which closely approach the sides of the web to prevent excessive lateral displacement of the spring element.

The assembled shoe is shown in Figures 2 and 3. In putting the rim, web and spring together, the first step is to slide the web into position on the rim by hooking the forward end of projection 48 over the forward edge of slot 34 and pushing the web forwardly with respect to the rim to bring the surface 42 of the web into engagement with the inner side of the rim. During this initial assembling step, the rear outer end of the web moves through the slot 40 provided in ledge 38.

When the web and rim have been placed together, with the projections 44, 46 and 48 extending through the slots 30, 32 and 34, respectively, the remaining step is to assemble the locking spring 26. The portions 72 and 74 of the base 58 of the spring element are placed inside the hook-shaped ledge 38, and the center portion 76 of the base 58 of the spring element is rotated into engagement with the inner part 78 of the ramp 52. As the rotation of the spring element is continued, the inwardly turned ends 64 and 66 of the spring element must be spread apart sufficiently to lie on opposite sides of the web. Further rotative movement of the spring element causes the ends 64 and 66 to slide along the sides of the web until they register with the slot 56, at which time the resilient force urging them toward one another causes them to snap into place in the slot, locking the spring element in position.

As the portion 76 of the base of the spring element moves up the ramp 52, the web is urged to move circumferentially forward with respect to the rim, thereby providing a resilient force which urges the hook 50 into tight engagement with the forward end 36 of the corresponding slot in the rim. In other words, the base 58 of the spring element acts as a spring between the ledge 38 on the rim and the ramp 52 on the web to exert a longitudinally acting force which holds the rim and web in engagement.

Owing to the engagement of the center portion 76 of the base of the spring element with abutment 54 at the end of ramp 52, a direct radial force is also exerted by the spring element tending to draw the rim and web together at the left, or rear, end. This radial tightening force is present because the resistance of the base of the spring element to lateral flexure tends to move the abutment 54 on the web radially outwardly with respect to the inner edge 80 of the ledge 38 on the rim.

The locking effect of the ends 64 and 66 of the arms of the spring element is enhanced by the pressure of ledge 38 against the base of the spring element, owing to the fact that such pressure urges the arms of the spring element toward one another.

The spring element 26 provides a positive lock which retains the rim and web in assembled relationship throughout the life of the brake shoe. At the same time it permits the rim to be readily detached from the web when servicing of the lining is required. And it also provides a desirable resilience in the shoe assembly which permits a slight flexing action in the shoe, and thereby tends to prevent brake noise which sometimes results from bonding the lining to the rim.

It will be noted that only a slight clearance is provided between the rear edge of projection 48 on the web and the rear edge of slot 34 in the rim. This clearance is preferably made small in order to limit any possible endwise movement of the rim with respect to the web when the drum is rotating in a clockwise direction.

Thus the maximum possible deflection of the base of the spring element during braking is limited to a very small distance. In the counter-clockwise direction of drum rotation (which is the direction of drum rotation when the vehicle is moving forwardly), the wrapping action of the drum merely increases the force holding surface 36 of the rim in engagement with surface 50 of the web.

When it is desired to detach the rim from the web in order to replace worn down lining, the operation is very simple. A suitable tool is used to spread the arms 60 and 62 of the spring element, forcing the locking ends 64 and 66 out of slot 56. Once the ends of the spring element have been pried out of slot 56, the spring element is simply rotated away from the rim until the portion 76 of the base is disengaged from the inner end 78 of ramp 52. This permits removal of the spring element, and the web can then be unhooked from the rim.

Probably the least expensive way to reline the shoes will be simply to replace the old rim with a factory-lined new rim, after which the shoe is reassembled in the manner previously explained. The entire disassembling and reassembling operation can be performed in a few seconds.

Figures 4 to 6 illustrate another embodiment of the invention which differs from the previously described embodiment only in slight degree. In describing the construction in Figures 4 to 6, the same reference numerals are used as were used to describe similar elements and parts in Figures 1 to 3, except that the letter "a" is added.

The brade shoe of Figures 4 to 6 has the same arrangement for guiding the rim on the web and for hooking the forward web projection on the rim as the shoe of Figures 1 to 3. The difference lies solely in the particular construction and arrangement of the spring element 26a. The rim 22a, instead of having a hook-shaped ledge at its rear end, has two laterally spaced slots 82, which are formed in depressions 84 provided in the rim. The portions 72a and 74a of the base of the spring element are bent outwardly to extend through the respective slots 82 and rest against the rear edges 38a of the slots. The center portion 76a of the base of the spring element engages the ramp 52a of the web 24a. The arrangement of the spring element is such that the guide portions 68a and 70a are formed adjacent the base of the spring element.

Figures 7 and 8 disclose a modification of the invention in which the portions 72b and 74b (same numerals as similar elements in other figures plus the letter "b") of the base of the spring element rest against individual hooks 86 and 88 formed by lancing the rim 22b and bending the ears inwardly. The center portion 76b of the base of the spring element 26b engages a ramp 52b, which is the front edge of an opening 90 provided in the outer edge of the web 24b.

Figures 9 and 10 show how the desired result can be accomplished with a spring element 26c which has only one locking arm 60c, the end 64c of which extends into the slot 56c. The portion 76c of the spring element which engages the ramp 52c is provided by the end of the spring element, and the portions 72c and 74c which engage the hook-shaped ledges 38c are formed in the spring element between the portion 76c and the arm 60c. A nib 92 is formed in the spring element and extends between the two ledges 38c to prevent lateral sliding movement of the spring element after the parts have been assembled.

Figures 11 and 12 illustrate a more elementary form of the invention in which the arms 60d and 62d of spring element 26d are snapped under ears 94 and 96 provided by lancing the rim 22d. The arrangement of the base of the spring element is the same as in the version shown in Figures 7 and 8.

Figures 13 and 14 show a very simple device for detachably securing the web to the rim, in which no provision is made for a resilient engaging force. Inwardly bent straps 98 and 99 are formed adjacent to the web in the rim 22e, the straps being integral parts of the rim. The web 24e extends through the slot 100 provided between the straps and has a hook-shaped opening 102 formed in its outer edge. A tapered pin 104 is driven into the space between the side of opening 102 and the straps 98 and 99, as shown. Preferably, the tapered pin is provided with a locking tooth 106 which engages one side of the strap to keep the pin from being accidentally disengaged.

Figures 15 and 16 illustrate a form of attaching device, in which a U-shaped spring clip 108 has an arm 110 which engages a strap 98f provided on the rim 22f and another arm 112 which extends through a slot 114 in the web 24f, to hold the web and rim together with a resilient force.

Although certain particular embodiments of my invention have been described, it will be understood by those skilled in the art that the object of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:

1. A T-section brake shoe comprising an arcuate sheet metal rim having friction lining material secured thereto and having a plurality of circumferentially spaced slots formed therein along the center line, the forward edge of the slot nearest one end of the rim having a surface of engagement which makes an acute angle with the outer surface of the rim, the opposite end of the rim being turned inwardly to provide a hook-shaped laterally-extending ledge; a detachable strengthening web which engages the inner side of the rim and which is provided with a plurality of outwardly extending projections extending into the slots formed in the rim, the forward edge of one of the projections having a surface which makes an acute angle with the outer edge of the projection and which engages the inclined surface of engagement of the aforementioned end slot, thereby causing the web and rim to be brought into tighter engagement as the web is urged toward the end of the rim having said inclined surface of engagement, the end of the web adjacent the hook-shaped ledge of the rim having a ramp opposite said ledge which terminates in an abutment near the underside of the rim, said web having a slot therethrough at a point near the underside of the rim and spaced somewhat from the ramp surface of the web; and a resilient retaining member for holding the web and rim in engagement consisting of a spring steel element having a curved base portion which engages the hook-shaped ledge of the rim at two spaced points and which engages the ramp on the web between the points of engagement with the ledge, the base portion of the spring steel element thereby providing a half-elliptic spring which exerts a tangential force holding the rim and web in engagement, the center portion of the base of the spring steel element also engaging the abutment at the end of the web ramp to exert a radial force holding the rim and web in engagement, said spring steel element having integral arms which extend along opposite sides of the web and which have inwardly turned ends extending into the aforementioned slot in the web to lock the spring steel element in place, said arms having inwardly curved guide portions intermediate their length which closely approach the sides of the web to prevent excessive lateral displacement of the spring steel element.

2. A T-section brake shoe comprising an arcuate sheet metal rim having friction lining material secured thereto and having a plurality of circumferentially spaced slots formed therein along the center line, the forward edge of the slot nearest one end of the rim having a surface of engagement which makes an acute angle with the outer surface of the rim, the opposite end of the rim being turned inwardly to provide a hook-shaped laterally-extending ledge; a detachable strengthening web which engages the inner side of the rim and which is provided with a plurality of outwardly extending projections extending into the slots formed in the rim, the forward edge of one of the projections having a surface which makes an acute angle with the outer edge of the projection and which engages the inclined surface of enagement of the aforementioned end slot, thereby causing the web and rim to be brought into tighter engagement as the web is urged toward the end of the rim having said inclined surface of engagement, the end of the web adjacent the hook-shaped ledge of the rim having a ramp opposite said ledge, said web having a slot therethrough at a point near the underside of the rim and spaced somewhat from the ramp surface of the web; and a resilient retaining member for holding the web and rim in engagement consisting of a spring steel element having a curved base portion which engages the hook-shaped ledge of the rim at two spaced points and which engages the ramp on the web between the points of engagement with the ledge, the base portion of the spring steel element thereby providing a half-elliptic spring which exerts a tangential force holding the rim and web in engagement, said spring steel element having integral arms which extend along opposite sides of the web and which have inwardly turned ends extending into the aforementioned slot in the web to lock the spring steel element in place, said arms having inwardly curved guide portions intermediate their length which closely approach the sides of the web to prevent excessive lateral displacement of the spring steel element.

3. A T-section brake shoe comprising an arcuate rim having friction lining material secured thereto and having a plurality of circumferentially spaced slots formed therein along the center line, the forward edge of the slot nearest one end of the rim providing a surface of engagement, the opposite end of the rim being turned inwardly to provide a laterally-extending ledge; a detachable strengthening web which engages the inner side of the rim and which is provided with a plurality of outwardly extending projections extending into the slots formed in the rim, the forward edge of one of the projections having a surface which engages the surface of engagement of the aforementioned end slot, in such a way as to cause the web and rim to be brought into tighter engagement as the web is urged toward the end of the rim having said surface of engagement, the end of the web adjacent the ledge of the rim having a ramp opposite said ledge, said web having a slot therethrough spaced somewhat from the ramp surface of the web; and a resilient retaining member for holding the web and rim in engagement consisting of a spring element having a curved base portion which engages the ledge of the rim at two spaced points and which engages the ramp on the web between the points of engagement with the ledge, said spring element having arms which extend along opposite sides of the web and which have inwardly turned ends extending into the aforementioned slot in the web to lock the spring element in place.

4. A T-section brake shoe comprising an arcuate rim having friction lining material secured thereto and having a plurality of circumferentially spaced slots formed therein along the center line, the forward edge of the slot nearest one end of the rim providing a surface of engagement, the rim being provided near its opposite end with aligned spring-supporting surfaces substantially normal to the rim proper; a detachable strengthening web which engages the inner side of the rim and which is provided with a plurality of outwardly extending projections extending into the slots formed in the rim, the forward edge of one of the projections having a surface which engages the surface of engagement of the aforementioned end slot in such a way as to cause the web and rim to be brought into tighter engagement with the web is urged toward the end of the rim having said surface of engagement, the end of the web adjacent the spring-supporting surfaces of the rim having an oppositely-disposed spring-supporting surface, said web having a slot therethrough spaced somewhat from said spring-supporting surface; and a resilient retaining member for holding the web and rim in engagement consisting of a spring element having a curved base portion which engages the spring-supporting surfaces of the rim at two spaced points and which engages the spring-supporting surface on the web between the points of engagement with the rim, said spring element having arms which extend along opposite sides of the web and which have inwardly turned ends extending into the aforementioned slot in the web to lock the spring element in place.

5. A T-section brake shoe comprising an arcuate rim having friction lining material secured thereto and having a plurality of circumferentially spaced slots formed therein along the center line, one edge of one of the slots providing a surface of engagement, the rim being provided with aligned spring-supporting surfaces substantially normal to the rim proper; a detachable strengthening web which engages the inner side of the rim and which is provided with a plurality of outwardly extending projections extending into the slots formed in the rim, one edge of one of the projections having a surface which engages the aforementioned surface of engagement in such a way as to cause the web and rim to be brought into tighter engagement as the web is urged longitudinally with respect to the rim, said web having a spring-supporting surface opposite the spring-supporting surfaces of the rim and, having a slot therethrough spaced somewhat from said spring-supporting surface; and a resilient retaining member for holding the web and rim in engagement consisting of a spring element having a curved base portion which engages the spring-supporting surfaces of the rim and which engages the spring-supporting surface on the web between the points of enagement with the rim, said spring element having arms which extend along opposite sides of the web and which have inwardly turned ends extending into the aforementioned slot in the web to lock the spring element in place.

6. A brake shoe comprising a rim having one or more slots formed therein along the center line, a flat strengthening web which is perpendicular to the rim and which detachably engages the inner side of the rim, said web being provided with one or more projections lying in the plane of said web and extending into the slot or slots in the rim, and a resilient shoe-assembling member which, when combined with the rim and web, exerts a spring force which retains the web in engagement with the rim.

7. A brake shoe comprising a rim, a flat rimless strengthening web which is perpendicular to the rim and which detachably engages the inner side of the rim, and a resilient shoe-assembling member which, when combined with the rim and web, exerts a spring force which retains the web in engagement with the rim.

8. A brake shoe rim comprising an arcuate sheet metal strip having friction lining material secured thereto and having a plurality of circumferentially spaced slots formed therethrough along the longitudinal center line and adapted to receive web projections, the forward edge of the slot nearest one end of the rim having a surface of engagement which makes an acute angle with the outer surface of the rim and which is arranged to be engaged by a complementary surface of a web projection, the opposite end of the rim being turned inwardly to provide a hook-shaped laterally-extending ledge which furnishes a supporting surface for a shoe-assembling spring element.

9. A brake shoe rim comprising an arcuate sheet metal strip having friction lining material secured thereto and having a plurality of circumferentially spaced slots formed therethrough intermediate its ends and along the center line, the forward edge of the slot nearest one end of the rim having a surface of engagement which makes an acute angle with the outer surface of the rim, the opposite end of the rim from said surface of engagement being turned inwardly to provide a laterally-extending ledge.

10. A brake shoe rim comprising an arcuate strip having friction lining material secured thereto and having a plurality of circumferentially spaced slots formed therethrough intermediate its ends and along the center line, one edge of one of the slots having a surface of engagement which is adapted to function as a cam while the rim is being combined with a brake shoe web.

11. A brake shoe comprising a flat web provided with a plurality of spaced radial projections which are coplanar with said web, one of such projections being provided with a locking cam surface, and a detachable rim comprising an arcuate strip having friction lining material secured thereto and having a plurality of circumferentially spaced slots, one edge of one of said slots having a surface of engagement adapted to engage the cam surface of the web, and the others of said slot being registrable with the other projections of the web.

12. A T-section brake shoe comprising an arcuate rim having friction lining material secured thereto and having a plurality of circumferentially-spaced slots formed therein along the center line, the rear end of the rim being turned inwardly to provide a laterally-extending ledge; a flat detachable strengthening web which engages the inner side of the rim and which is provided with a plurality of outwardly-extending projections extending into the slots formed in the rim, the forward edge of the projection nearest the forward end of the rim having a surface which makes an acute angle with the outer edge of the projection, in order to hook the web to the rim and cause the web and rim to be brought into tighter engagement as the web is urged toward the forward end of the rim; and a resilient retaining member for holding the web and rim in engagement consisting of a spring element which engages the rim ledge at two laterally-spaced points and which engages the adjacent end of the web between the points of engagement with the ledge, the spring element thereby providing a half-elliptic spring which exerts a tangential force urging the web toward the forward end of the rim.

13. A T-section brake shoe comprising an arcuate rim having friction lining material secured thereto and having a plurality of circumferentially-spaced slots formed therein along the center line, one edge of the slot nearest one end of the rim providing a surface of engagement, the opposite end of the rim being turned inwardly to provide a laterally-extending ledge; a detachable strengthening web which engages the inner side of the rim and which is provided with a plurality of outwardly-extending projections extending into the slots formed in the rim, one edge of one of the projections having a surface which engages the aforesaid surface of engagement in such a way as to cause the web and rim to be brought into tighter engagement as the web is urged toward the end of the rim having said surface of engagement; and a resilient retaining member for holding the web and rim in engagement consisting of a spring element which engages the ledge of the rim at two laterally-spaced points and which engages the adjacent end of the web between the points of engagement with the ledge.

14. A brake shoe comprising a rim having one or more slots formed therein intermediate its ends and along the center line, a strengthening web which is perpendicular to the rim and which detachably engages the inner side of the rim, said web being provided with one or more projections coplanar with said web and extending into the slot or slots in the rim, one edge of one of the projections having a surface which engages the edge of the corresponding slot in such a way as to cause the web and rim to be urged toward engagement as the web is moved longitudinally with respect to the rim, and a resilient retaining member which urges the web to move longitudinally with respect to the rim and thereby maintains the web and rim in assembled relationship, said resilient member having guide portions which limit the lateral movement of the resilient member with respect to the web and thereby hold said member in assembled position.

15. A brake shoe comprising a rim having one or more slots, a ledge formed on one end of said rim, a slot remote from the ledge end of said rim being inclined upwardly and outwardly from said ledge end to provide a surface of engagement, a strengthening web which is perpendicular to the rim and which detachably engages the inner side of the rim, one or more outwardly disposed projections formed on the outer edge of said web and enterable into said slots, an edge of a projection being inclined to engage said surface of engagement, an abutment formed on the end of said web adjacent said ledge, and a resilient retaining member engaging said ledge and said abutment to hold said rim against displacement from said web.

16. A brake shoe comprising a rim having one or more longitudinally-extending slots formed therein along the center line, said rim being provided with a laterally-extending spring-supporting surface which is not parallel to the surface of the rim proper, a flat rimless strengthening web which is in a plane perpendicular to the rim and which detachably engages the inner side of the rim, said web being provided on its rim-engaging edge with one or more outwardly extending projections which extend into the slot or slots in the rim, one edge of one of the projections having a surface which engages the edge of the corresponding slot in such a way as to cause the web and rim to be urged radially into tighter engagement as the web is moved longitudinally with respect to the rim, said web having a spring-engaging surface opposite the spring-supporting surface of the rim, and a resilient retaining member for holding the web and rim in engagement consisting of a spring element which engages the spring-supporting surface of the rim at two laterally-spaced points and which engages the spring-engaging surface of the web between the points of engagement with the rim to exert a force tending to move the web longitudinally with respect to the rim.

17. A brake shoe comprising a rim having one or more slots formed therein along the center line, said rim being provided with a spring-supporting surface which is not parallel to the surface of the rim proper, a flat rimless strengthening web which is in a plane perpendicular to the rim and which detachably engages the inner side of the rim, said web being provided with one or more projections extending outwardly from its rim-engaging edge and into the slot or slots in the rim, one edge of one of the projections having a surface which engages the edge of the corresponding slot in such a way as to cause the web and rim to be urged toward engagement as the web is moved longitudinally with respect to the rim, said web having a spring-engaging surface opposite the spring-supporting surface of the rim, and a resilient retaining member for holding the web and rim in assembled relationship, said member engaging the spring-supporting surface of the rim and the spring-engaging surface of the web to urge the web to move longitudinally with respect to the rim.

18. A brake shoe comprising a rim having one or more slots formed therein along the center line, a flat strengthening web which is perpendicular to the rim and which detachably engages the inner side of the rim, said web being provided with one or more outwardly extending projections coplanar with said web and extending into the slot or slots in the rim, one edge of one of the projections having a surface which engages the edge of the corresponding slot in such a way as to cause the web and rim to be urged toward engagement as the web is moved longitudinally with respect to the rim, a resilient retaining member which urges the web to move longitudinally with respect to the rim and thereby maintains the web and rim in assembled relationship, and means for locking said resilient member in position to hold the assembled elements together.

BRYAN EDWARD HOUSE.

REFERENCES CITED

The following references are of record in the file of this patent:

UNITED STATES PATENTS

| Number | Name | Date |
|---|---|---|
| 332,693 | Herrman | Dec. 15, 1885 |
| 743,794 | Adreon | Nov. 10, 1903 |
| 1,862,124 | Skelton | June 7, 1932 |
| 1,873,025 | Perrot et al. | Aug. 23, 1932 |
| 1,975,713 | Christenson | Oct. 2, 1934 |
| 2,027,823 | Hoffman | Jan. 14, 1936 |
| 2,128,467 | Merritt | Aug. 30, 1938 |
| 2,139,409 | Hunter | Dec. 6, 1938 |
| 2,140,727 | Williams | Dec. 20, 1938 |